(12) United States Patent
Coon

(10) Patent No.: US 10,820,512 B2
(45) Date of Patent: Nov. 3, 2020

(54) STALK ROLL WITH BLADE INSERTS FOR AGRICULTURAL COMBINE

(71) Applicant: Deere & Company, Moline, IL (US)

(72) Inventor: Steve A. Coon, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 105 days.

(21) Appl. No.: 16/108,987

(22) Filed: Aug. 22, 2018

(65) Prior Publication Data
US 2020/0060085 A1    Feb. 27, 2020

(51) Int. Cl.
*A01D 45/02*    (2006.01)

(52) U.S. Cl.
CPC ......... *A01D 45/023* (2013.01); *A01D 45/025* (2013.01)

(58) Field of Classification Search
CPC ..... A01D 45/023; A01D 45/025; A01F 12/20; A01F 12/24; A01F 12/446; A01F 12/10; A01F 7/06
See application file for complete search history.

(56) References Cited

U.S. PATENT DOCUMENTS

| | | | | |
|---|---|---|---|---|
| 1,493,626 | A | * | 5/1924 | Gebhardt ................ A01F 11/06 460/31 |
| 1,929,586 | A | | 10/1933 | Holland-Letz |
| 2,346,317 | A | * | 4/1944 | Lyle ................... A01D 34/8355 172/540 |
| 2,845,972 | A | | 8/1958 | Hedtke |
| 3,090,183 | A | | 5/1963 | Thomson |
| 3,141,281 | A | | 7/1964 | Gaunt et al. |
| 3,214,897 | A | * | 11/1965 | Phares ................. A01D 34/535 56/505 |
| 3,603,064 | A | | 9/1971 | Pinkham |
| 3,673,774 | A | | 7/1972 | Mizzi |
| 3,705,481 | A | | 12/1972 | Willet |
| 3,791,114 | A | | 2/1974 | Fowler |

(Continued)

FOREIGN PATENT DOCUMENTS

| | | |
|---|---|---|
| EP | 0486887 A2 | 5/1992 |
| EP | 1040746 A1 | 10/2000 |

(Continued)

OTHER PUBLICATIONS

Deere & Company, image of agricultural header stalk roll blades, undated, admitted prior art.

(Continued)

*Primary Examiner* — Abigail A Risic
(74) *Attorney, Agent, or Firm* — Klintworth & Rozenblat IP LLP

(57) ABSTRACT

A stalk roll mountable to a header of an agricultural combine for rotation about a rotation axis during processing of plant stalks has an annular drum with detachable blades. The stack roll has a plurality of circumferentially spaced flutes extending in an axial direction of the rotation axis of the drum and projecting radially outwardly from the drum. The flutes define mounting surfaces along lengths of the flutes. A plurality of blades are attachable to the drum with multiple of the plurality of blades being attachable to the mounting surface of a common one of the flutes. Mounting hardware is configured to removably connect the blades to the mounting surfaces of the flutes.

20 Claims, 13 Drawing Sheets

(56) References Cited

U.S. PATENT DOCUMENTS

| | | |
|---|---|---|
| 3,863,431 A | 2/1975 | Fowler |
| 3,995,520 A | 12/1976 | Spargo |
| 4,065,912 A | 1/1978 | Quick |
| 4,152,883 A | 5/1979 | Quick |
| 4,165,596 A | 8/1979 | Duncan |
| 4,232,775 A | 11/1980 | Duncan |
| 4,270,337 A | 6/1981 | Pinto |
| 4,295,325 A | 10/1981 | Cannavan |
| 4,319,718 A | 3/1982 | Snavely et al. |
| 4,380,281 A | 4/1983 | Duncan |
| 4,386,492 A | 6/1983 | Tilby |
| 4,443,999 A | 4/1984 | Leigers |
| 4,483,129 A | 11/1984 | Lester |
| 4,483,130 A | 11/1984 | Duncan |
| 4,512,142 A | 4/1985 | Landry et al. |
| 4,550,552 A | 11/1985 | Stiff |
| 4,574,567 A | 3/1986 | Morellini |
| 4,584,824 A | 4/1986 | Hiyamuta |
| 4,702,423 A | 10/1987 | Cerveira de Mello Ribeiro Pinto |
| 4,722,174 A * | 2/1988 | Landry .................. A01D 45/10 56/119 |
| 4,845,930 A * | 7/1989 | Dow .................... A01D 45/021 56/113 |
| 5,031,392 A | 7/1991 | Baker |
| 5,092,110 A | 3/1992 | Dommert et al. |
| 5,240,192 A | 8/1993 | Tilby et al. |
| 5,269,126 A * | 12/1993 | Kalverkamp ........ A01D 45/025 56/60 |
| 5,303,533 A | 4/1994 | Caillouet |
| 5,313,771 A | 5/1994 | France et al. |
| 5,379,577 A | 1/1995 | Caillouet |
| 5,379,578 A | 1/1995 | Landry et al. |
| 5,404,699 A * | 4/1995 | Christensen ........ A01D 45/025 460/31 |
| 5,414,981 A | 5/1995 | Landry et al. |
| 5,488,820 A | 2/1996 | Cannavan |
| 5,564,967 A | 10/1996 | Jorgensen |
| 5,622,034 A | 4/1997 | Dommert |
| 6,062,009 A | 5/2000 | Caillouet |
| 6,216,428 B1 * | 4/2001 | Becker ................. A01D 45/025 56/104 |
| 6,935,095 B1 | 8/2005 | Sluder |
| 7,409,972 B2 | 8/2008 | Haapasalo |
| 7,874,134 B1 | 1/2011 | Hoffman |
| 8,162,249 B2 | 4/2012 | Andersson et al. |
| 8,167,226 B2 | 5/2012 | Engnell |
| 8,272,701 B2 | 9/2012 | Mulligan |
| 8,615,978 B2 | 12/2013 | Hinds |
| 8,790,228 B2 | 7/2014 | Wirth et al. |
| 9,210,842 B2 * | 12/2015 | Lohrentz ............. A01D 45/025 |
| 10,039,232 B2 * | 8/2018 | Calmer ................ A01D 45/025 |
| 10,076,082 B2 | 9/2018 | Fattepur et al. |
| 10,537,058 B2 * | 1/2020 | Ehle ........................ A01D 34/44 |
| 2001/0002683 A1 | 6/2001 | Dykstra et al. |
| 2005/0120695 A1 * | 6/2005 | Calmer ................ A01D 45/021 56/51 |
| 2010/0043371 A1 * | 2/2010 | Rieck .................. A01D 45/025 56/14.7 |
| 2013/0111871 A1 | 5/2013 | Hinds |
| 2014/0053523 A1 | 2/2014 | Straeter |
| 2014/0096660 A1 | 4/2014 | Turner |
| 2014/0208870 A1 | 7/2014 | Quaderer et al. |
| 2018/0054960 A1 * | 3/2018 | Gessel ................. A01D 34/015 |
| 2018/0168103 A1 * | 6/2018 | Calmer ................. A01D 47/00 |

FOREIGN PATENT DOCUMENTS

| | | |
|---|---|---|
| EP | 1049367 A1 | 11/2000 |
| EP | 1264528 A1 | 12/2002 |
| EP | 1430765 A1 | 6/2004 |
| WO | 0030427 A1 | 6/2000 |
| WO | 2013134397 A1 | 9/2013 |
| WO | 2014031314 A3 | 2/2014 |

OTHER PUBLICATIONS

Agco Corp, image of agricultural header stalk roll blade, undated, admitted prior art.

Case IH, image of agricultural header stalk roll blades, undated, admitted prior art.

Dragotec, image of agricultural header stalk roll blades, undated, admitted prior art.

European Search Report issued in counterpart European Patent Application No. 19192448.9 dated Jan. 28, 2020 (5 pages).

* cited by examiner

STALK ROLL WITH BLADE INSERTS FOR AGRICULTURAL COMBINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural combines, and more specifically, to stalk roll assemblies for stalk-processing headers for agricultural combines.

BACKGROUND OF THE DISCLOSURE

Agricultural combines may process crops (e.g., corn) having stalks. Headers for modern agricultural combines may have a number of row crop dividing units that direct the stalks into channels of row units located between the row crop dividing units. Gathering chains in the channel of each row unit may draw the stalks towards the header. Stalk rolls of each row unit located beneath the gathering chains may pull the stalks rapidly downward through the channel between two deck plates above the stalk rolls. Due to the channel between the deck plates being smaller than the harvestable commodity (e.g., ears of corn), the harvestable commodity may separate from the stalks when the stalks are pulled through the channel forcing the harvestable commodity to come in contact with the deck plates while the stalks are returned to the field. The gathering chains may then move the harvestable commodity from the deck plates to an auger which may move the harvestable commodity to a feederhouse of the header. The feederhouse may then move the harvestable commodity from the header into the combine for processing.

SUMMARY OF THE DISCLOSURE

This disclosure provides an improved stalk roll with detachable blade inserts, as well as row units and a header having such stalk rolls, for use in an agricultural combine.

In one aspect, the disclosure provides a stalk roll mountable to a header of an agricultural combine for rotation about a rotation axis during processing of plant stalks. The stalk roll includes an annular drum having a plurality of circumferentially spaced flutes extending in an axial direction of the rotation axis of the drum and projecting radially outwardly from the drum. The flutes define mounting surfaces along lengths of the flutes. A plurality of blades are attachable to the drum with multiple of the plurality of blades being attachable to the mounting surface of a common one of the flutes. Mounting hardware is configured to removably connect the blades to the mounting surfaces of the flutes.

In another aspect, the disclosure provides a header for an agricultural combine. The header includes pairs of stalk rolls, each pair of stalk rolls having a first drum spaced apart from a second drum by a channel in which plant stalks are received. Each of the drums is rotatable about a rotation axis. Each of the drums has flutes projecting radially outwardly from an annular surface and extending in an axial direction of the rotation axis. The flutes define mounting surfaces along their lengths. A plurality of blades are attachable to the mounting surfaces of the flutes. Multiple of the plurality of blades are attachable to the mounting surface of each flute. Mounting hardware is configured to removably connect the blades to the mounting surfaces of the flutes.

The details of one or more embodiments are set forth in the accompanying drawings and the description below. Other features and advantages will become apparent from the description, the drawings, and the claims.

DETAILED DESCRIPTION

Figure 1:
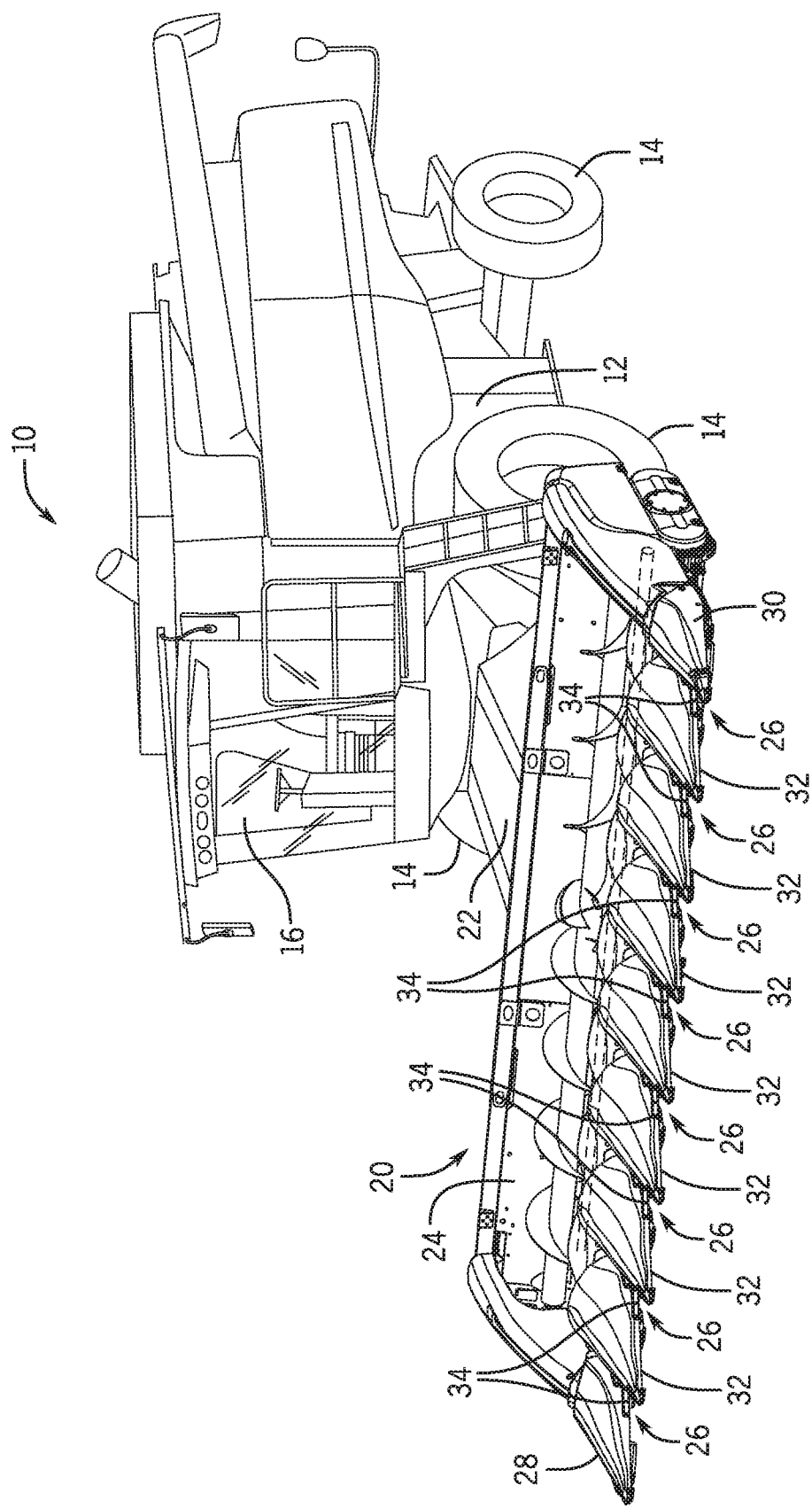
FIG. 1 is a front perspective view of one embodiment of an agricultural combine with an attached header.

The following describes one or more example embodiments of a stalk roll arrangement with blade inserts for use with an agricultural combine. Embodiments of the present disclosure are shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Agricultural combines with headers for processing crop with stalks (e.g., corn) typically have stalk rolls with blades that fell the crop and separate the harvestable commodity from the stalk. Conventional stalk rolls may be castings in one or two parts with integrally cast blades that are machined to sharp tip. When a portion of a stalk roll is damaged during use (e.g., chipping at the leading edge of a blade), the entire stalk roll may need to be replaced. Further, different blade configurations may be desired for processing different crop, in which case different types of stalk rolls may be required. Even for the same crop different stalk rolls may be needed depending on various processing considerations, for example, one type of blade set may be used when the stalks are to be returned to the field intact, and another may be used when the stalks are to be returned to the field partially or wholly cut.

This disclosure provides a stalk roll having blades detachably mounted to mounting surfaces of circumferentially spaced flutes of an annular drum. The stalk roll may be mountable to a header of an agricultural combine for processing of plant stalks. By using this arrangement, when a portion of the stalk roll is damaged instead of replacing the entire stalk roll only the particular blade(s) that was damaged may need to be replaced.

In certain embodiments, multiple blades may be detachably mounted to the same flutes. Mounting surfaces of the flutes of the stalk roll may be arranged to support multiple surfaces of each of the detachable blades such as through a multi-surfaced pocket or other type of arrangement. In such manner, less stress may be put on each of the blades and on the mounting hardware used to attach them to the flutes. This may allow for less mounting hardware to be used.

In certain embodiments, the detachable blades and annular drum may be made of varying materials. For instance the detachable blades may be made of brittle materials having high wear properties, while the annular drum may be made of more ductile materials to handle high input loads. This may extend the longevity of the annular drum and the stalk roll by making each of materials suited to accommodate their respective functions including wear and loads. In one or more examples, the annular drum portion and mounting flutes may be a casting (e.g., a monolithic part) or multiple cast parts (e.g., semi-annular fluted parts), and the blades may be separate forged parts with or without machining for sharpened tips.

In certain embodiments, seat inserts may be mounted intermediate the flutes and their associated detachable blades. The seat inserts may have a higher surface finish at a blade-contacting side than at a flute-contacting side as a lower level of precision may be needed at the flute-contacting side which in turn reduces manufacturing cost. Further, the detachable blades, the seat inserts, and the annular drum may each be made of varying materials. For instance, the detachable blades may be made of brittle materials that have high wear properties, while the seat inserts may comprise more ductile materials to handle the input loads. The annular drum may be made of a softer, more ductile material than the seat inserts to handle the high load on the annular drum. This may extend the longevity of the detachable blades, the annular drum, the seat inserts, and the stalk roll by making each of materials suited to accommodate their respective functions including wear and loads.

In certain embodiments, the detachable blades attached to the flutes of the stalk roll, or attached to one or more common flutes of the stalk roll, may be different. For instance, the detachable blades may differ in a shape, size, configuration, orientation, radial height, axial length, width, sectional profile, sharpness, or in another manner. This may allow for varying functions to be achieved. For instance, in one or more embodiments a round, short, blunt blade may be used upstream at the front of the stalk roll where stress is highest as the stalks initially enter the header, and taller, sharper blades may be used downstream of the stalk roll where the stress is lower after the stalks have already entered the header. In other embodiments, the detachable blades of the stalk roll may be sharped and oriented to completely cut the stalk rolls. In other embodiments, the detachable blades of the stalk roll may be configured to be duller and oriented to only partially cut the stalk or to leave the stalk intact. In such manner, by using varying types of detachable blades different functions may be achieved without having to manufacture different stalk rolls. In other embodiments, the blades may have a different profile or cross-section along a portion of their lengths relative to one or more other portions of their lengths. For example, a leading edge of the blade may have a blunt tip configuration, while the remainder of the blade has a sharp tip. In other embodiments, a single flute may mount multiple blades (and multiple seats). The multiple plates of the single flute may have the same configuration and profile, or they may different (e.g., in tip configuration (i.e., angle, curvature, sharpness/bluntness), thickness, height, and so on).

In certain embodiments, the detachable blades mounted to the mounting surfaces of the stalk roll may be reversible. For instance, each detachable blade may define multiple cutting tips with one of the cutting tips being in contact with the mounting surfaces when the blade is mounted to the flute and another cutting tip being exposed to the stalks. In other embodiments, the cutting tips may be identical prior to the stalks being cut. When one cutting tip used to cut the stalks becomes dull the detachable blade may be detached from the mounting surface, and the blade may be reversed and reattached to the mounting surface to use an unused tip to cut the stalks. In such manner, a dull blade can be quickly reversed to use a sharp blade without having to replace the entire stalk roll or even the blade itself. The cutting tips of the detachable and reversible blades may also be different such as, for example, to vary in their size, shape, configuration, orientation, sharpness, curvature, etc. As an example, when a complete or partial cut of the stalks is desired a cutting tip oriented to completely cut the stalks may be used, and when a lesser cut of the stalks is desired or when it is desired to leave the stalks intact the detachable blade may be reversed to use another cutting tip oriented to achieve a lesser cut of the stalks. In such manner, detachable, reversible blades having varied cutting tips may be alternately varied as needed in the same stalk roll to achieve different functions without having to use different stalk rolls.

Referring now to FIG. 1, the example agricultural combine 10 may include a chassis 12 with wheels 14. The wheels 14 may be mounted to the chassis 12, and engage with the ground in order to propel the combine 10. A cab 16, which may also be mounted to the chassis 12, houses an operator as well as various devices to control the combine 10. The wheels 14 and other devices of the combine 10 may be powered by an internal combustion engine (hidden from view).

A header 20 may be supported at the front of the combine 10 in order to cut and gather crop material from a field. The header 20 may be supported by a feederhourse 22, which is pivotally mounted to the chassis 12. The feederhouse 22 may include, for example, a powered inclined conveyor (not shown) for transport of cut crop material from the header 20 into the body of the combine 10 for processing.

Figure 2:
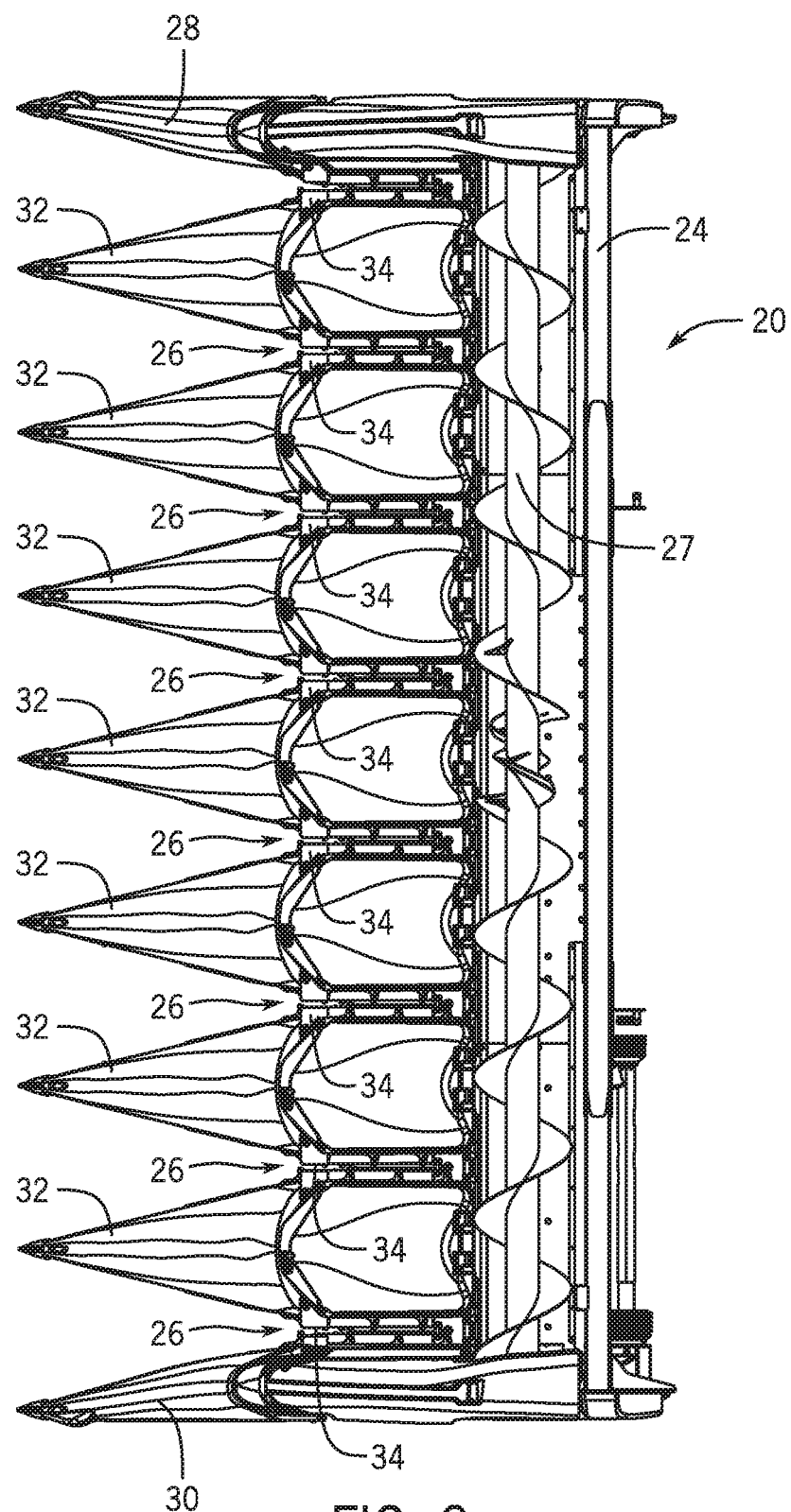
FIG. 2 is a partially, disassembled top view of a portion of the header of FIG. 1.
Figure 3:
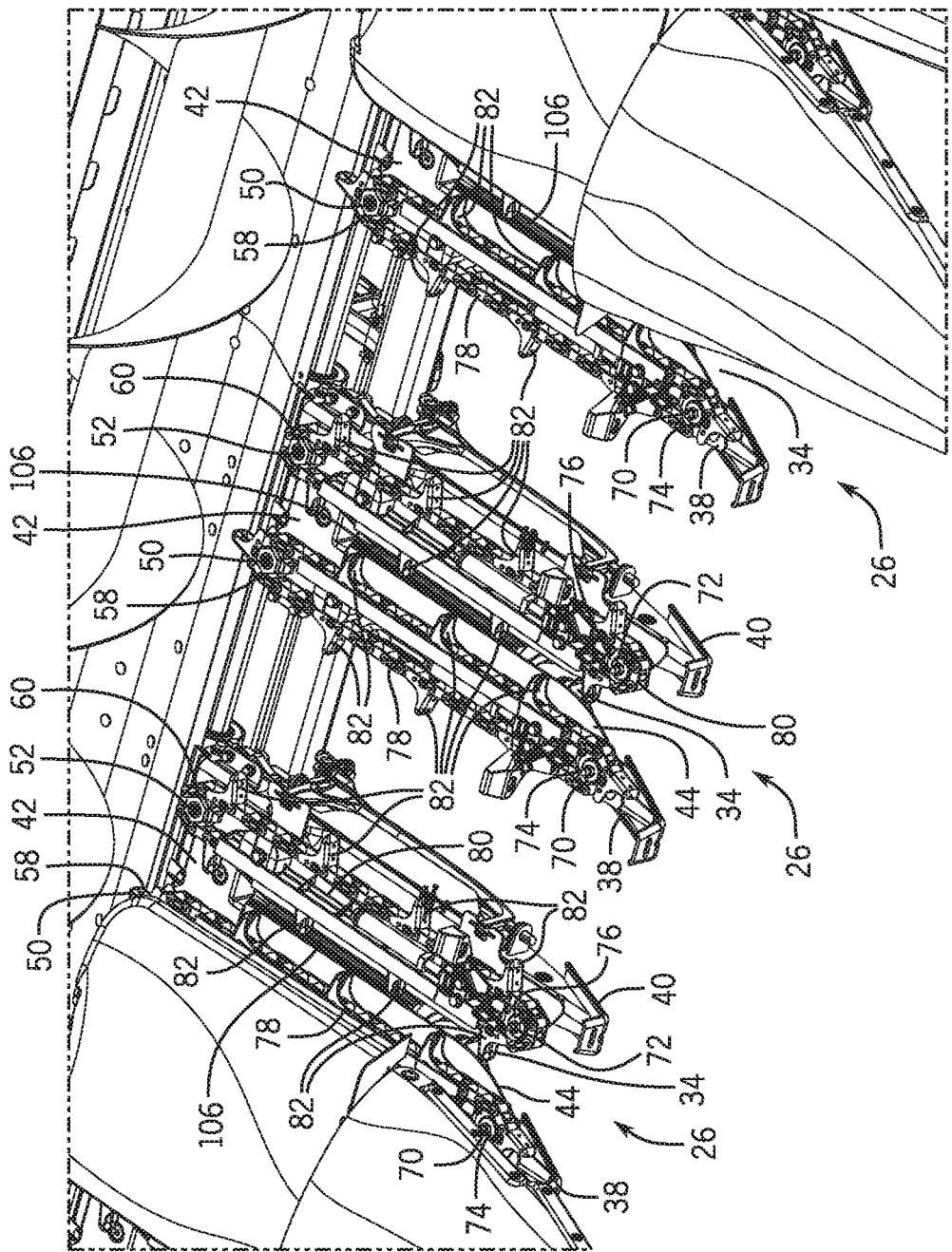
FIG. 3 is a front perspective view of a few row units of the header of FIG. 1.
Figure 4:
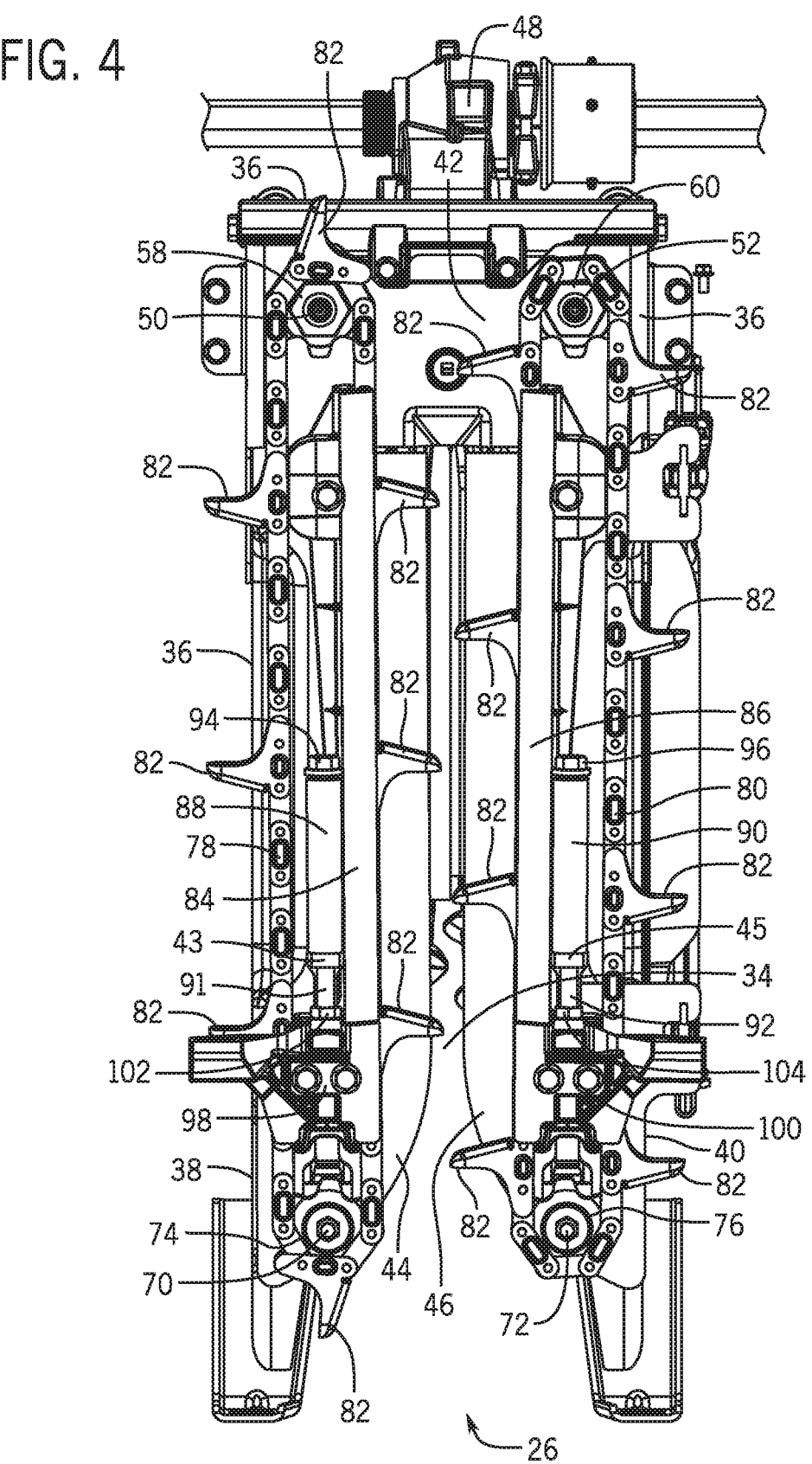
FIG. 4 is a top view of one of the row units of FIG. 3.
Figure 5:
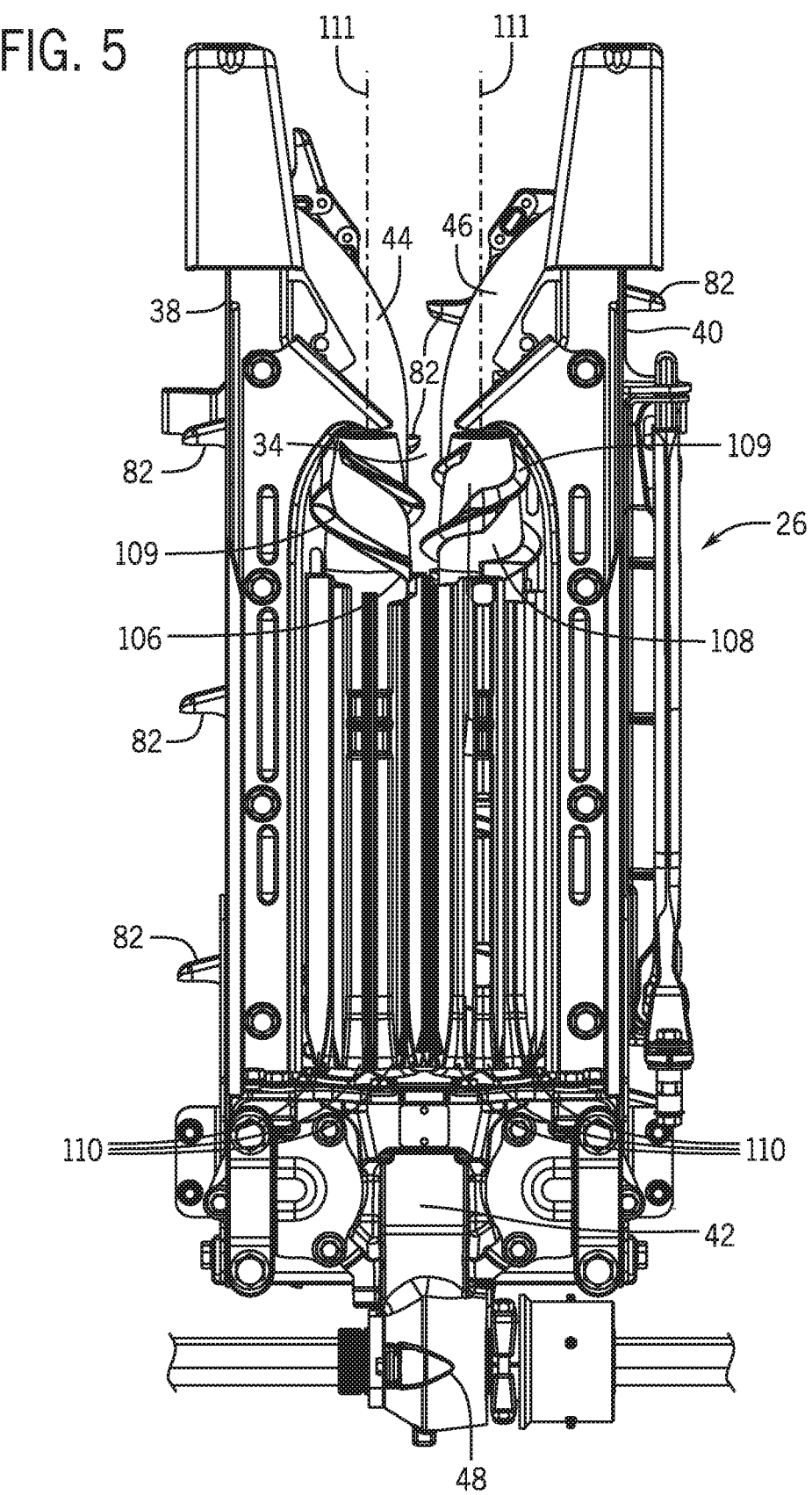
FIG. 5 is a bottom view of the row unit shown in FIG. 4.
Figure 6:
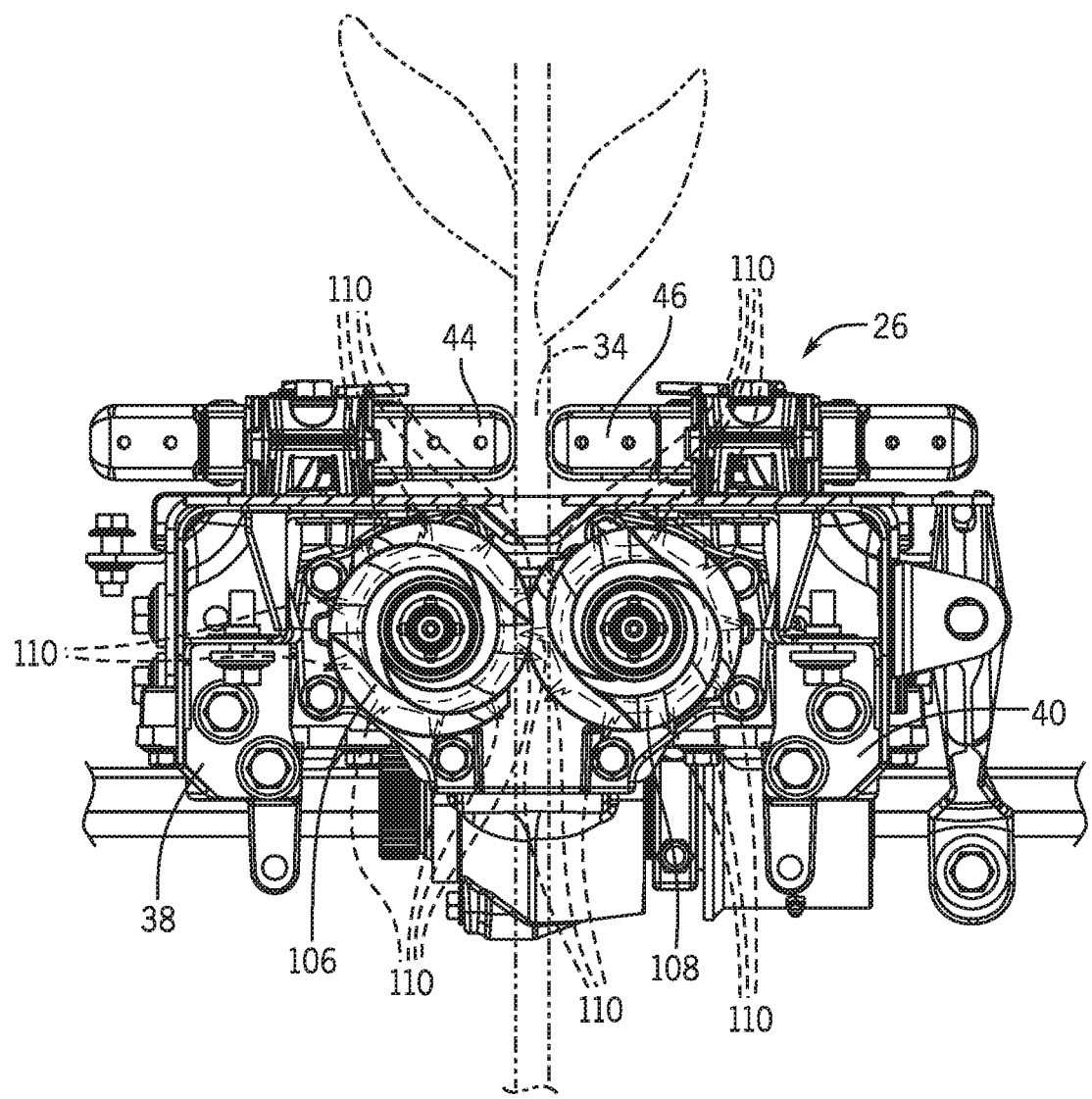
FIG. 6 is a partial front view of the row unit shown in FIG. 4.

Referring to FIGS. 1 and 2 collectively, the header 20 may include a transversely extending frame 24 across the width of which may be attached a plurality of forwardly projecting row units 26 spaced in side-by-side relationship to each other a distance commensurate with that of the spacing between adjacent rows of the crop (such as corn) to be harvested. The row units 26 may be mounted for transverse adjustment in order to accommodate various crop row spacing. A powered, rotatable auger 27 may be disposed within the transversely extending frame 24. The powered, rotatable auger 27 may move the cut crop material to the feederhouse 22. Mounted to the row units 26 and serving to separate comingled stalks of adjacent rows from one another may be crop dividers including right and left dividers 28 and 30, respectively, at the opposite ends of the header 20, and seven identical central dividers 32 between them. The seven identical central dividers 32 may be centered relative to rows to be harvested and relative to a central fore-and-aft extending relatively narrow channel 34 defined by each row unit 26, as described below in further detail.

Referring to FIGS. 3-6 collectively, it can be seen that each row unit 26 may include a U-shaped row unit frame 36 (see FIG. 4) including right and left, fore-and-aft extending legs 38 and 40, respectively, having rear ends joined by a bight portion 42. Right and left planar deck plates 44 and 46 may be respectively secured to the planar top surfaces of the legs 38 and 40. The right and left planar deck plates 44 and 46 may have parallel opposed inner edges spaced apart so as to define the aforementioned narrow channel 34 which is adapted for receiving stalks of an aligned row as the row unit 26 proceeds along the row. The deck plates 44 and 46 may contain laterally elongated openings (not shown) receiving fasteners so that the deck plates 44 and 46 may be adjusted laterally.

Mounted beneath the bight portion 42 of the row unit frame 36 may be a gear box 48. The gear box 48 may contain a pair of bevel gears (not shown) having parallel, upwardly projecting right and left gathering chain drive shafts 50 and 52 mounted therein and projecting upwardly through openings provided in the bight portion 42. Right and left drive sprockets 58 and 60 may be respectively mounted to upper end regions of the drive shafts 50 and 52. Located at forward regions of the frame legs 38 and 40 may be right and left chain tensioning assemblies comprising flat side bars 43 and 45. Mounted for rotation in front of the flat side bars 43 and 45 may be right and left idler shafts 70 and 72. Mounted on the shafts 70 and 72 may be idler sprockets 74 and 76. Forming an endless loop about the right set of drive and idler sprockets 58 and 74 may be a right gathering chain 78, while a similar left gathering chain 80 may be looped about the left set of drive and idler sprockets 60 and 76. The gathering chains 78 and 80 may each include a plurality of outwardly projecting lugs 82 spaced along the length of the chains 78 and 80. The lugs 82 at inner runs of the chains 78 and 80 may project into the associated channel 34 so as to engage stalks of plants. The flat side bars 43 and 45 may be guided for fore-and-aft movement by elongate structures 84 and 86 that are located within the loops defined by the chains and serve as chain guides to prevent the opposed inner runs of the chains from deflecting outwardly relative to the channel 34. The right and left chain tensioning assemblies comprising the flat side bars 43 and 45 may further include right and left coil compression springs (not shown) located within cylindrical housings 88 and 90, and together with the cylindrical housings 88 and 90 may be carried on right and left guide rods 91 and 92. The right and left guide rods 91 and 92 may be in the form of bolts and may be respectively inserted forwardly through first eyes 94 and 96 fixed to the deck plates 44 and 46. Forward ends of the guide rods 91 and 92 may be inserted through openings provided in brackets 98 and 100. The brackets 98 and 100 may be fixed to forward end locations of the guide elongate structures 84 and 86. The right and left guide rods 91 and 92 may be secured to the brackets 98 and 100 by sets of nuts 102 and 104. The right coil compression spring (not shown) may be compressed between the eye 94 and the flat side bar 43, while the left coil compression spring (not shown) may be compressed between the eye 96 and the flat side bar 45.

Stalk rolls 106 and 108 may be mounted to a pair of drive shafts (not shown) which project from the gear box 48 and extend within interior shafts (not shown) of the stalk rolls 106 and 108. The stalk rolls 106 and 108 may be located beneath the deck plates 44 and 46. The stalk rolls 106 and 108 may have auger flights 109 configured to draw stalks into the channel 34 as the stalk rolls 106 and 108 rotate as they are powered by the gear box 48. The stalk rolls 106 and 108 may have blades 110 configured to, as the stalk rolls 106 and 108 rotate around their rotation axis 111, draw the stalks down through the channel 34 defined by the deck plates 44 and 46. Stalk roll 106 rotates clockwise while stalk roll 108 rotates counter-clockwise. The deck plates 44 and 46 may cause the ears, which are too large to pass downwardly through the channel 34, to become detached from the stalks. The lugs 82 of the powered, moving gathering chains 78 and 80 may move the detached ears from the deck plates 44 and 46 to the auger 27. The powered, rotating auger 27 may move the ears from the auger 27 to the feederhourse 22. The feederhouse 22 may move the ears from the feederhouse 22 out of the header 20 into the body of the combine 10 for processing.

Figure 7:
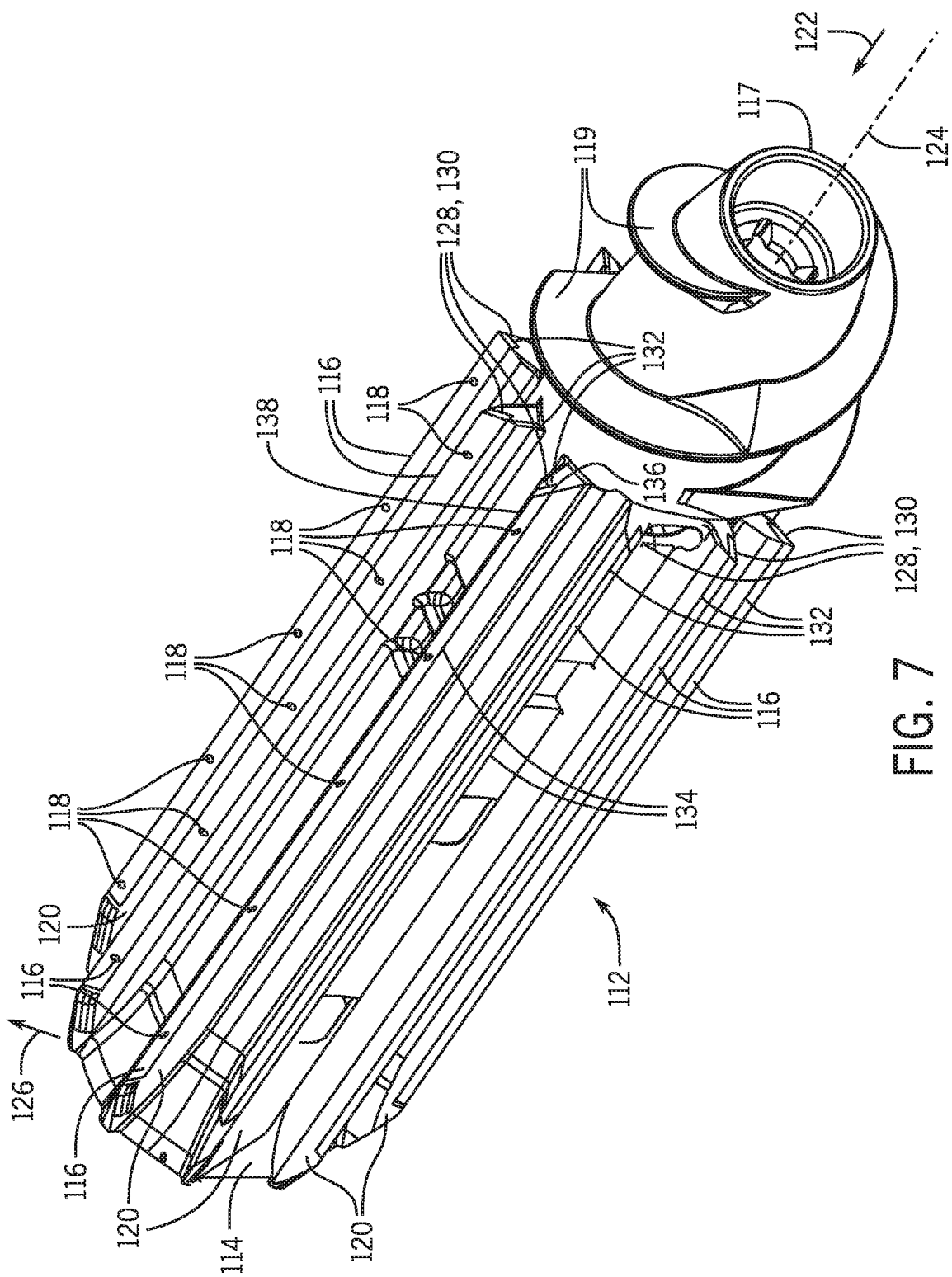
FIG. 7 is a top perspective view of one embodiment of a stalk roll.

Referring to FIG. 7, one embodiment of a stalk roll 112 that may be substituted for stalk roll 108 of the header 20 of the embodiment of FIGS. 1-6 comprises an annular drum 114, a plurality of blades 116, and mounting hardware 118. It is noted that a reverse mirror image of the stalk roll 112 may be substituted for the stalk roll 106 of the header 20 of the embodiment of FIGS. 1-6. The annular drum 114 may define a leading end 117 with auger flights 119 configured to direct stalk along a plurality of circumferentially spaced flutes 120 extending in an axial direction 122 of the rotation axis 124 of the drum 114 and projecting radially outwardly in direction 126 from the drum 114. The flutes 120 may define mounting surfaces 128 along lengths of the flutes 120. A single blade 116 may be mounted to the mounting surface 128 of each flute 120 so that only one blade 116 is mounted to each flute 120. Mounting a single detachable blade 116 to the mounting surface 128 of each flute 120 allows flexibility as when only one of the blades 116 is damaged only that blade 116 needs to be replaced rather than replacing the entire stalk roll 112. This may be extremely efficient. In other embodiments, as discussed later, any number of blades 116 may be mounted to the mounting surface 128 of each common flute 120 to provide increased flexibility as to the types of cuts of the stalk and during repair.

Each mounting surface 128 may comprise a multisided pocket configured to make surface contact with multiple sides of the associated blade 116. Each mounting surface 128 of each of the flutes 120 may be defined at a radially outer surface 130 of the associated flute 120 and may include a backstop blade support 132 upstream from the blades 116 in the direction of rotation of the drum 114 about the rotation axis 124. The backstop blade support 132 may extend radially outward in direction 126 farther than a base 134 of the associated flute 120 downstream of the blades 116 in the direction of rotation of the drum 114 about the rotation axis 124. The backstop blade support 132 may comprise a flat surface which is configured to make surface contact with a back surface of the associated blade 116. The base 134 may also comprise a flat surface which is configured to make surface contact with a bottom surface of the associated blade 116. By supporting multiple surfaces of each blade 116 using the mounting surface 128, the stress and load on each blade 116 and its associated mounting hardware 118 is lessened. In other embodiments, the mounting surface 128 of each flute 116 may comprise any number, configuration, and shape of surfaces to contact and support any number, shape, and configuration of surfaces of the associated blade 116 in order to accommodate varying loads and stresses.

The mounting hardware 118 may be configured to removably connect the blades 116 to the mounting surfaces 128 of the flutes 120. The mounting hardware 118 may comprise removable threaded fasteners having heads which engage either the associated blade 116 or the associated flute 120. In other embodiments, the mounting hardware 118 may comprise varying types and numbers of mounting hardware. Due to the support provided by the mounting surfaces 128 to the blades 116, the load on the mounting hardware 118 may be greatly reduced which allows the use of lower strength materials and less mounting hardware 118. In other embodiments, the mounting hardware 118 may comprise any number, type, or configuration of mounting hardware to attach the associated blade 116 to the associated flute 120. The blades 116 may be identical to one another. In other embodiments, the blades 116 may vary in shape, type, sharpness, or configuration to achieve varying functions such as to accommodate varied stresses or loads or to achieve varying types of cuts of stalk. The blades 116 may comprise two cutting tips 136 and 138 which are reversibly mounted to the mounting surface 128 of the flute 120. In one configuration, cutting tip 136 may be in contact with the mounting surface 128 while cutting tip 138 is exposed to cut stalk. In a reversed configuration, cutting tip 138 may be in contact with the mounting surface 128 while cutting surface 136 is exposed to cut stalk. The cutting tips 136 and 138 may be a same shape and sharpness. In other embodiments, the cutting tips 136 and 138 may comprise different shapes, types, and sharpness. By using reversible blades 116 much more flexibility is achieved as when one cutting tip gets dull the blade 116 can be reversed to use the other cutting tip. Similarly, when reversible blades 116 having differing cutting tips are used, the blades 116 can be reversed to use one cutting tip for one type of cut and a differing cutting tip for a second type of cut or to keep the stalk intact. In still other embodiments, each blade 116 may comprise any number, type, shape, and configuration of cutting surfaces to accommodate differing stresses and loads or to achieve varying types of cuts of the stalk.

The blades 116 and annular drum 114 may be made of varying materials. For instance the blades 116 may be made of brittle materials having high wear properties, while the annular drum 114 may be made of more ductile materials to handle high input loads. This may extend the longevity of the annular drum 114 and the stalk roll 112 by making each of materials suited to accommodate their respective functions including wear and loads. It is noted that differing materials for the detachable blades and annular drums may be used for any of the embodiments disclosed herein.

Figure 8:
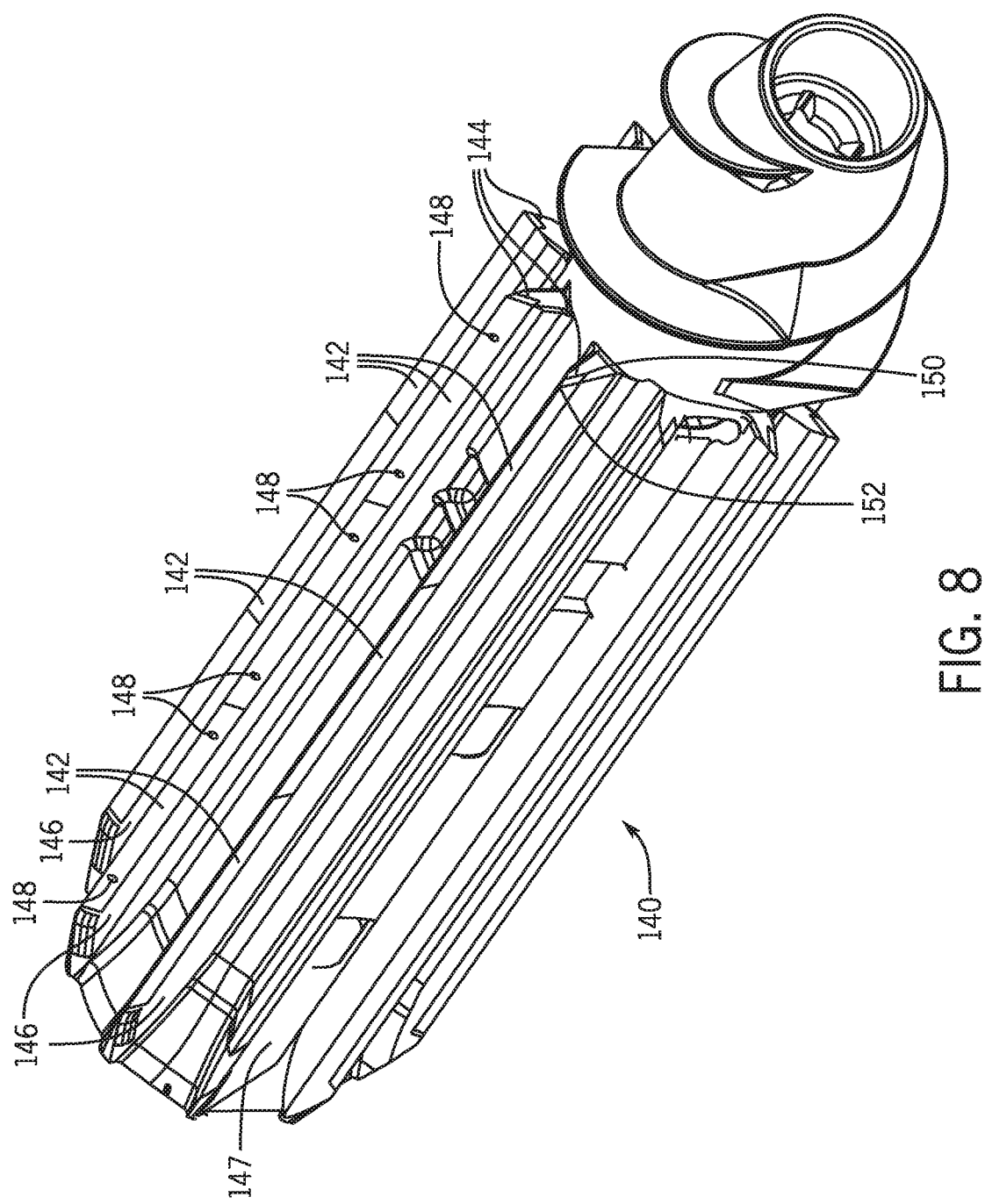
FIG. 8 is a top perspective view of another embodiment of a stalk roll.

Referring to FIG. 8, another embodiment of a stalk roll 140 that may be substituted for stalk roll 108 of the header 20 of the embodiment of FIGS. 1-6 is shown. It is noted that a reverse mirror image of the stalk roll 140 may be substituted for the stalk roll 106 of the header 20 of the embodiment of FIGS. 1-6. The stalk roll 140 may be identical to the stalk roll 112 of FIG. 7 with the exception that a plurality of blades 142 may be attached to the mounting surface 144 of each flute 146 of the annular drum 147 of the stalk roll 140 with mounting hardware 148. Attaching a plurality of blades 142 to each mounting surface 144 of each common flute 146 allows for more flexibility during repair as only the damaged blade(s) 142 needs to be replaced rather than having to replace a blade extending the entire length of the flute 146. The mounting surface 144, flutes 146, and mounting hardware 148 may each be identical to the respective mounting surface 128, flutes 120, and mounting hardware 118 of FIG. 7. The plurality of blades 142 may each be identical to one another in shape, size, configuration, and sharpness. The plurality of blades 142 may each be reversible with opposed cutting tips 150 and 152 similar to the opposed cutting tips 136 and 138 of the reversible blades 116 of FIG. 7. In other embodiments, the plurality of blades 142 may vary in number, type, shape, sharpness, and configuration to accommodate varying functions such as differing stresses and loads or to achieve differing types and configuration of cuts of stalk.

Figure 9:
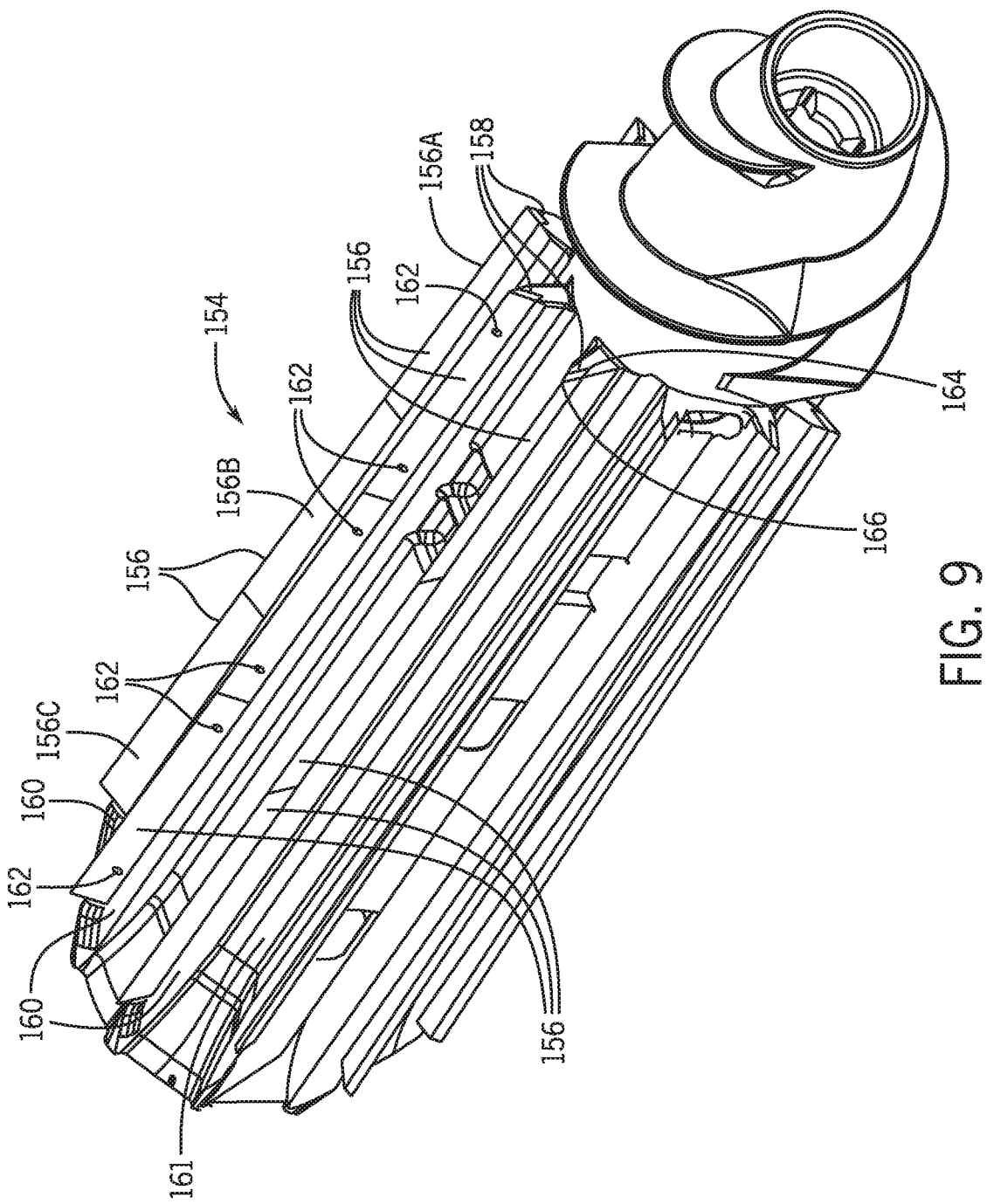
FIG. 9 is a top perspective view of still another embodiment of a stalk roll.

Referring to FIG. 9, another embodiment of a stalk roll 154 that may be substituted for stalk roll 108 of the header 20 of the embodiment of FIGS. 1-6 is shown. It is noted that a reverse mirror image of the stalk roll 154 may be substituted for the stalk roll 106 of the header 20 of the embodiment of FIGS. 1-6. The stalk roll 154 may be identical to the stalk roll 140 of FIG. 8 with the exception that differing (non-identical) blades 156 may be attached to the mounting surface 158 of each flute 160 of the annular drum 161 of the stalk roll 154 with mounting hardware 162. The mounting surface 158, flutes 160, and mounting hardware 162 may each be identical to the respective mounting surface 144, flutes 146, and mounting hardware 148 of FIG. 8. Two or more of the plurality of blades 156 may differ from one another in shape, size, configuration, orientation, radial height, axial length, width, sectional profile, sharpness, or in another manner to accommodate varying stresses or loads or to achieve varying types of cuts of stalk. For instance, in a same common flute 160, the first blade 156A may have a smaller radial height than the second blade 156B, and the second blade 156B may have a smaller radial height than the third blade 156C. The smaller radial height of the first blade 156A may accommodate the higher stress put on the leading end of the first blade 156A as stalks enter the header, while the second and third blades 156B and 156C may have progressively higher radial heights due to their progressively reduced stress. The plurality of blades 156 may each be reversible with opposed cutting tips 164 and 166 similar to the opposed cutting tips 150 and 152 of the reversible blades 142 of FIG. 8. In other embodiments, the plurality of blades 156 may vary further in number, type, shape, sharpness, and configuration to accommodate varying functions such as differing stresses and loads or to achieve differing types and configuration of cuts of stalk.

Figure 10:
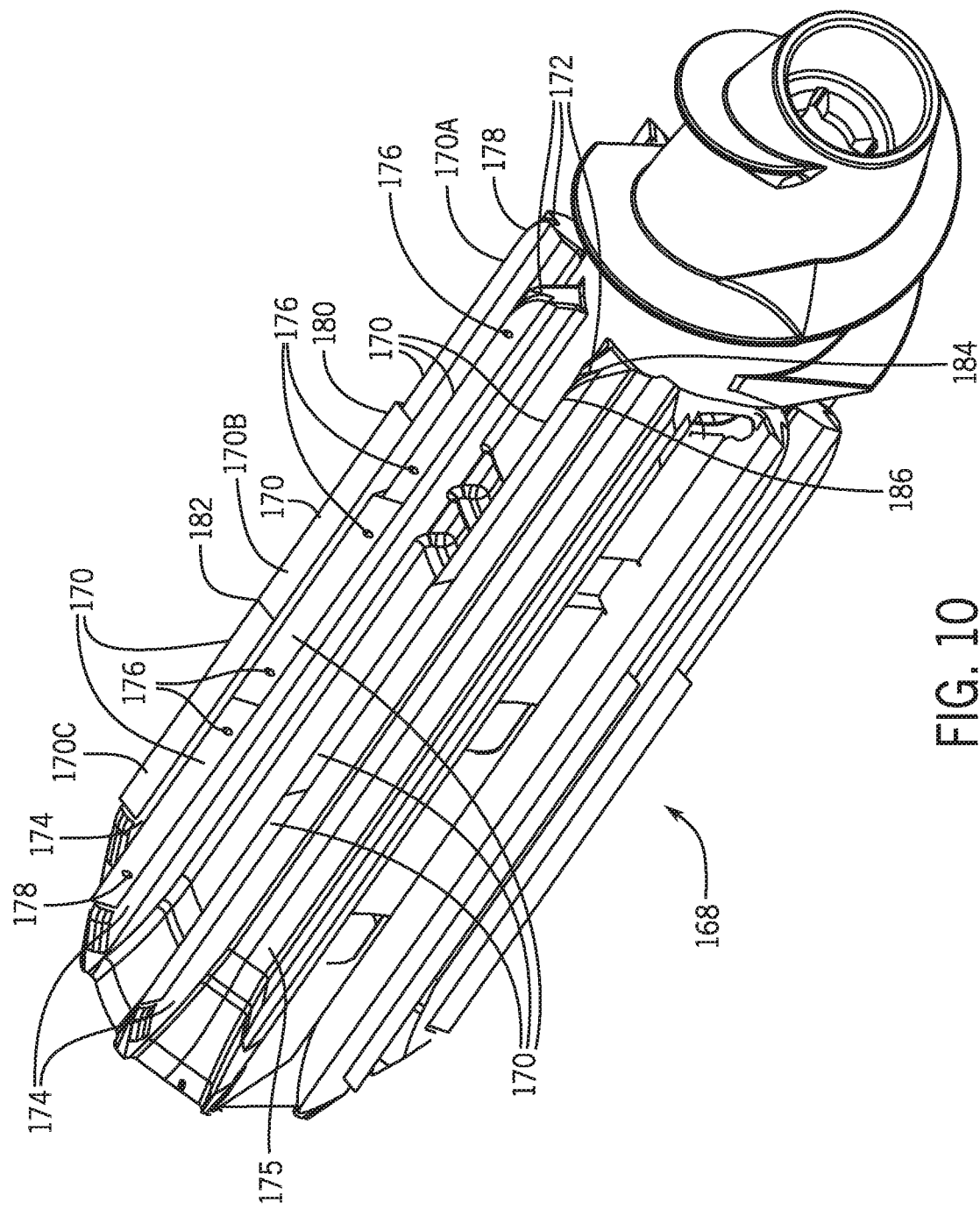
FIG. 10 is a top perspective view of yet another embodiment of a stalk roll.

Referring to FIG. 10, another embodiment of a stalk roll 168 that may be substituted for stalk roll 108 of the header 20 of the embodiment of FIGS. 1-6 is shown. It is noted that a reverse mirror image of the stalk roll 168 may be substituted for the stalk roll 106 of the header 20 of the embodiment of FIGS. 1-6. The stalk roll 168 may be identical to the stalk roll 140 of FIG. 8 with the exception that differing (non-identical) blades 170 may be attached to the mounting surface 172 of each flute 174 of the annular drum 175 of stalk roll 168 with mounting hardware 176. The mounting surface 172, flutes 174, and mounting hardware 176 may each be identical to the respective mounting surface 144, flutes 146, and mounting hardware 148 of FIG. 8. Two or more of the plurality of blades 170 may differ from one another in a radial height, an axial length, a width, a sectional profile, a sharpness, a type, a size, or a configuration to accommodate varying stresses or loads or to achieve varying types of cuts of stalk. For instance, in a same common flute 174, the first blade 170A may have a round, radial, blunt tip 178 relative to the second and third blades 170B and 170C which may have much sharper tips 180 and 182 of greater height and different configuration. The round, radial, blunt tip 178 of shorter height may accommodate the higher stress put on the leading end of the first blade 170A as stalks enter the header, while the second and third blades 170B and 170C may be of greater height and sharper throughout their cutting surface due to lack of a need to accommodate increased stress. The plurality of blades 170 may each be reversible with opposed cutting tips 184 and 186 similar to the opposed cutting tips 150 and 152 of the reversible blades 142 of FIG. 8. In other embodiments, the plurality of blades 170 may vary in number, type, shape, sharpness, and configuration to accommodate varying functions such as differing stresses and loads or to achieve differing types and configuration of cuts of stalk.

Figure 11:
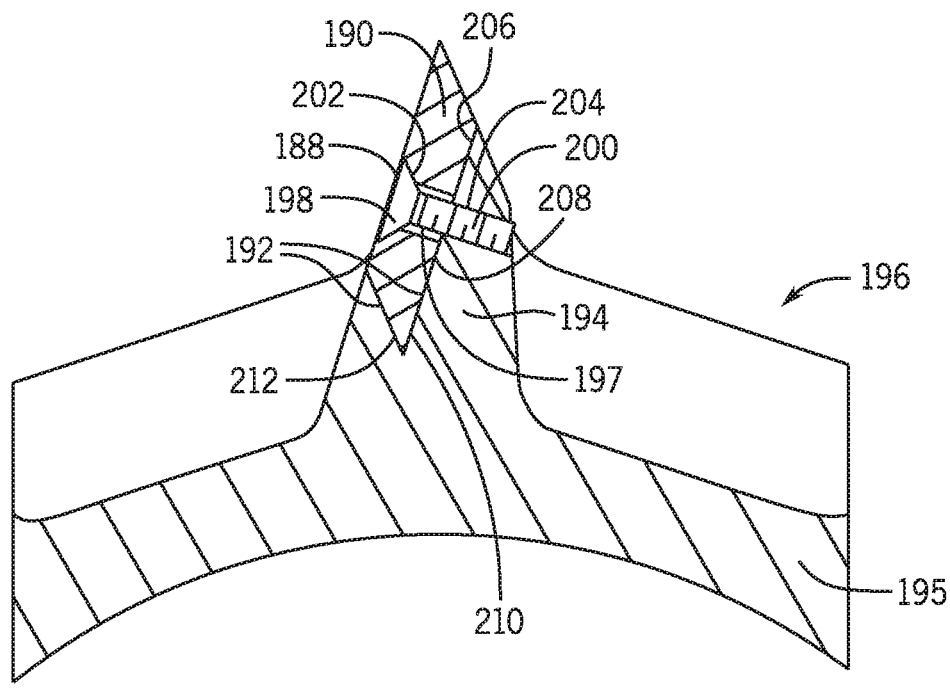
FIG. 11 is a partial cross-section view through a flute of an annular drum of one embodiment of a stalk roll.

Referring to FIG. 11, one embodiment is shown of mounting hardware 188 attaching a blade 190 to a mounting surface 192 of a flute 194 of an annular drum 195 of a stalk roll 196. Any of the stalk roll embodiments disclosed herein may utilize this arrangement to mount their respective blades. The mounting hardware 188 may comprise a removable threaded fastener 197 comprising a head 198 and a threaded shaft 200. The head 198 may abut against a counter-sunk hole 202 in the blade 190. The threaded shaft 200 may extend through the counter-sunk hole 202 in the blade 190 into a hole 204 in the flute 194 of the annular drum 195 of the stalk roll 196. The back surface 206 of the blade 190 may be supported by the flat backstop blade support 208 of the mounting surface 192 of the flute 194, while the bottom surface 210 of the blade 190 may be supported by the flat base 212 of the mounting surface 192 of the flute 194. The flat backstop blade support 208 may extend radially outward farther than the flat base 212. The use of the mounting surface 192 to support multiple surfaces of the blade 190 reduces stress and load on the blade 190 and the mounting hardware 188 which allows the use of lower strength materials and less mounting hardware 188. In other embodiments, the mounting hardware 188 and the mounting surface 192 may vary in shape, type, or configuration to accommodate varying stresses or loads.

Figure 12:
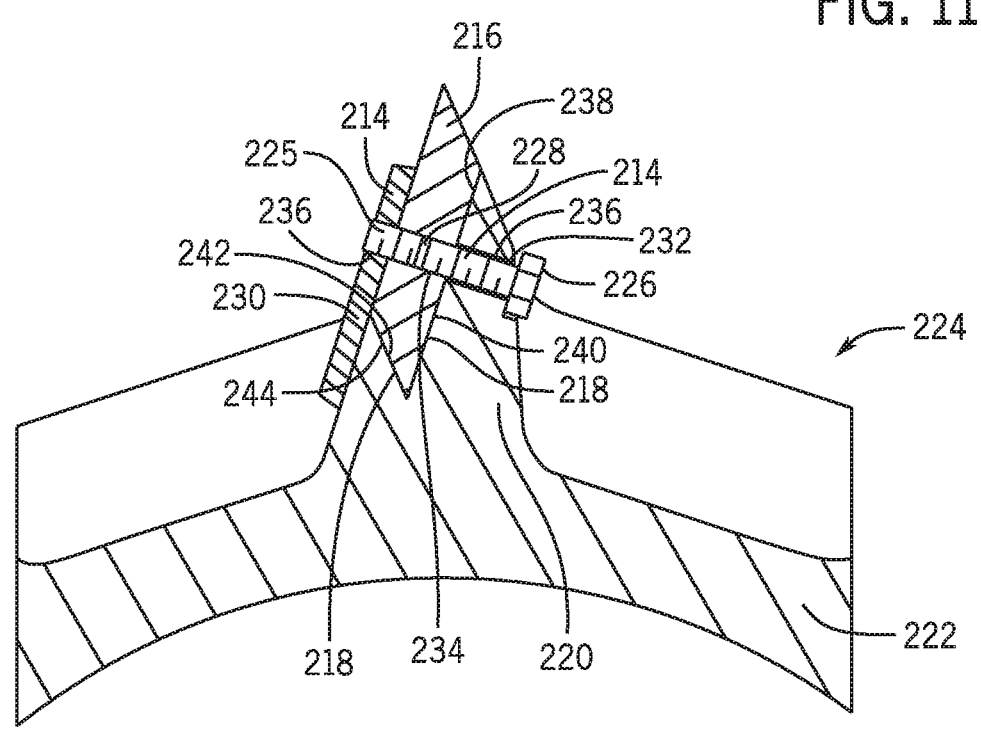
FIG. 12 is a partial cross-section view through a flute of an annular drum of another embodiment of a stalk roll.

Referring to FIG. 12, another embodiment is shown of mounting hardware 214 attaching a blade 216 to a mounting surface 218 of a flute 220 of an annular drum 222 of a stalk roll 224. Any of the stalk roll embodiments disclosed herein may utilize this arrangement to mount their respective blades. The mounting hardware 214 may comprise a removable threaded fastener 225 comprising a head 226 and a threaded shaft 228, and a clamp bar 230. The head 226 may abut against a counter-sunk hole 232 in the flute 220 of the annular drum 222 of the stalk roll 224. The threaded shaft 228 may extend through the counter-sunk hole 232 in the flute 220 of the annular drum 222 of the stalk roll 224, through a hole 234 in the blade 216, into a hole 236 in the clamp bar 230. The clamp bar 230 may abut against both the blade 216 and the flute 220 to secure the blade 216 to the mounting surface 218 of the flute 220. The back surface 238 of the blade 216 may be supported by the flat backstop blade support 240 of the mounting surface 218 of the flute 220, while the bottom surface 242 of the blade 216 may be supported by the flat base 244 of the mounting surface 218 of the flute 220. The flat backstop blade support 240 may extend radially outward farther than the flat base 244. The use of the mounting surface 218 to support multiple surfaces of the blade 216 reduces stress and load on the blade 216 and the mounting hardware 214 which allows the use of lower strength materials and less mounting hardware 214. In other embodiments, the mounting hardware 214 and the mounting surface 218 may vary in shape, type, or configuration to accommodate varying stresses or loads.

Figure 13:
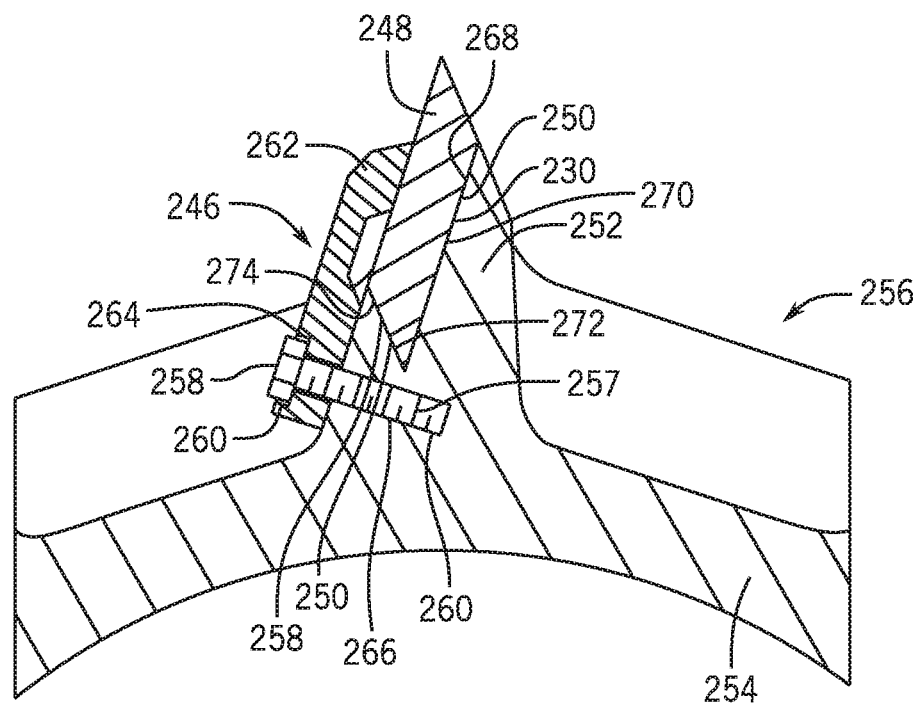
FIG. 13 is a partial cross-section view through a flute of an annular drum of still another embodiment of a stalk roll.

Referring to FIG. 13, another embodiment is shown of mounting hardware 246 attaching a blade 248 to a mounting surface 250 of a flute 252 of an annular drum 254 of a stalk roll 256. Any of the stalk roll embodiments disclosed herein may utilize this arrangement to mount their respective blades. The mounting hardware 246 may comprise a removable threaded fastener 257 comprising a head 258 and a threaded shaft 260, and a clamp bar 262. The head 258 may abut against a counter-sunk hole 264 in the clamp bar 262. The threaded shaft 260 may extend through the counter-sunk hole 264 in the clamp bar 262, through a hole 266 in the flute 252 of the annular drum 254 of the stalk roll 256. The clamp bar 262 may abut against both the blade 248 and the flute 252 to secure the blade 248 to the mounting surface 250 of the flute 252. The back surface 268 of the blade 248 may be supported by the flat backstop blade support 270 of the mounting surface 250 of the flute 252, while the bottom surface 272 of the blade 248 may be supported by the flat base 274 of the mounting surface 250 of the flute 252. The flat backstop blade support 270 may extend radially outward farther than the flat base 274. The use of the mounting surface 250 to support multiple surfaces of the blade 248 reduces stress and load on the blade 248 and the mounting hardware 246 which allows the use of lower strength materials and less mounting hardware 246. In other embodiments, the mounting hardware 246 and the mounting surface 250 may vary in shape, type, or configuration to accommodate varying stresses or loads.

Figure 14:
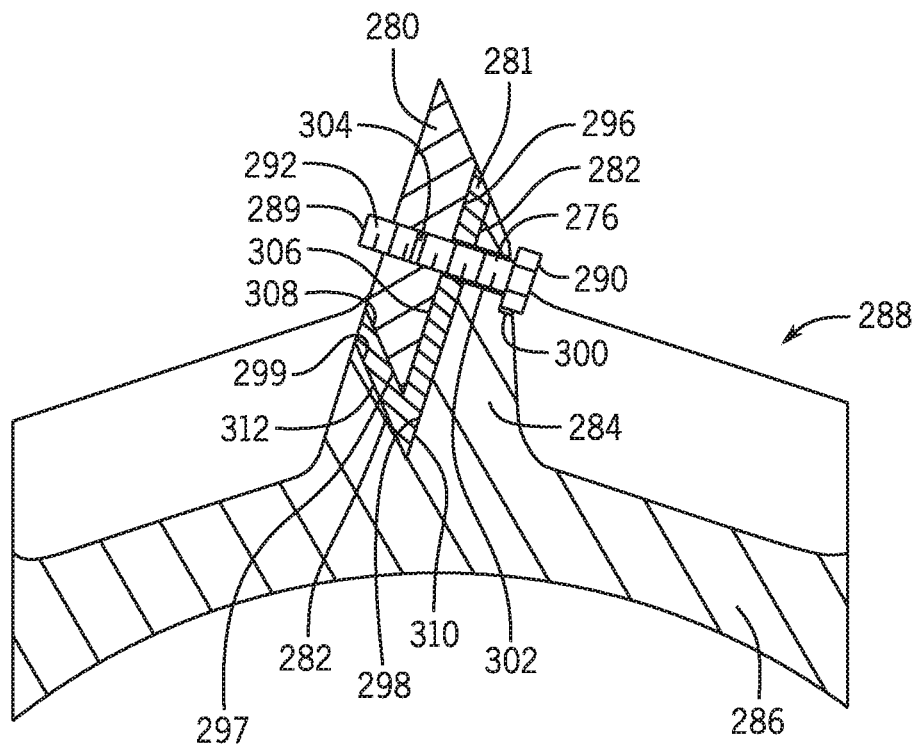
FIG. 14 is a partial cross-section view through a flute of an annular drum of yet another embodiment of a stalk roll.

Referring to FIG. 14, another embodiment is shown of mounting hardware 276 attaching a blade 280 to a seat insert 281, and attaching the seat insert 281 to a mounting surface 282 of a flute 284 of an annular drum 286 of a stalk roll 288. Any of the stalk roll embodiments disclosed herein may utilize this arrangement to mount their respective blades. The mounting hardware 276 may comprise a removable threaded fastener 289 comprising a head 290 and a threaded shaft 292. The seat insert 281 may be mounted intermediate the flute 284 of the annular drum 286 and the blade 280. The seat insert 281 may have a higher surface finish at blade-contacting sides 296 and 297 than at flute-contacting sides 298 and 299. This may reduce manufacturing cost as a high surface finish is not needed at the flute-contacting sides 298 and 299. The head 290 may abut against a counter-sunk hole 300 in the flute 284 of the annular drum 286 of the stalk roll 288. The threaded shaft 292 may extend through the counter-sunk hole 300 in the flute 284 of the annular drum 286 of the stalk roll 288, through a hole 302 in the seat insert 281, through a hole 304 in the blade 280. The back surface 306 of the blade 280 may be supported by the blade-contacting side 296 of the seat insert 281, while the bottom surface 308 of the blade 280 may be supported by the blade-contacting side 297 of the seat insert 281. The flute-contacting side 298 of the seat insert 281 may be supported by the flat backstop support 310 of the mounting surface 282 of the flute 284, while the flute-contacting side 299 of the seat insert 281 may be supported by the flat base 312 of the mounting surface 282 of the flute 284. The flat backstop support 310 may extend radially outward farther than the flat base 312. The use of the mounting surface 282 to support multiple surfaces of the seat insert 281, and the use of the seat insert 281 to support multiple surfaces of the blade 280 reduces stress and load on the blade 280, seat insert 281, and mounting hardware 276 which allows for the use of lower strength materials and less mounting hardware 276. In other embodiments, the mounting hardware 276, the mounting surface 282, and the seat insert 281 may vary in shape, type, or configuration to accommodate varying stresses or loads.

The blade 280, seat insert 281, and the annular drum 286 may each be made of varying materials. For instance, the blade 280 may be made of brittle materials that have high wear properties, while the seat insert 281 may comprise more ductile materials to handle the input loads. The annular drum 286 may be made of a softer, more ductile material than the seat insert 281 to handle the high load on the annular drum 286. This may extend the longevity of the annular drum 286, the seat insert 281, and the stalk roll 288 by making each of materials suited to accommodate their respective functions including wear and loads.

Figure 15A:
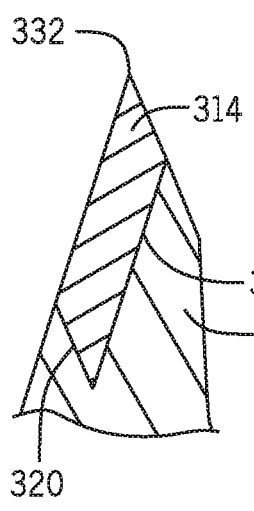
FIGS. 15A-15C are partial cross-section views through the flutes of annular drums of different example stalk rolls.
Like reference symbols in the various drawings indicate like elements.
Figure 15B:
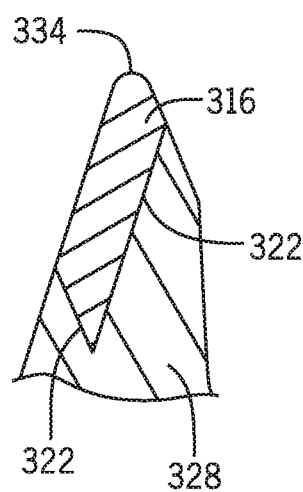
Figure 15C:
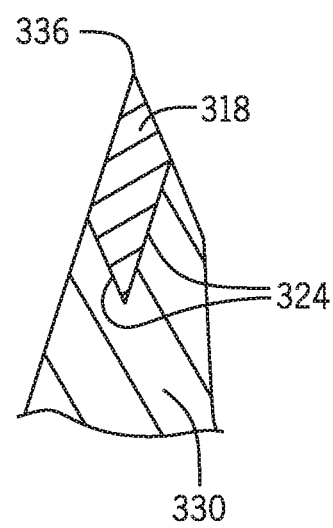

Referring to FIGS. 15A-15C, different exemplary blades 314, 316, and 318 are shown mounted to differing shaped mounting surfaces 320, 322, and 324 of flutes 326, 328, and 330. The differing shaped mounting surfaces 320, 322, and 324 may be shaped to support multiple surfaces of the differing shaped exemplary blades 314, 316, and 318. These differing shaped exemplary blades 314, 316, and 318 may be detachably mounted to any of the mounting surfaces of the stalk roll embodiments disclosed herein using mounting hardware. As shown, blade 314 may be longer than blades 316 and 318, and blades 314 and 318 may have sharper tips 332 and 336 than the blunt, round, radial tip 334 of blade 316. Blade 314 may also have a differently oriented tip 332 than the tip 336 of blade 318. In other embodiments, differing blades may be attached to differing shaped mounting surfaces of flutes of annular drums of stalk rolls. The differing blades may differ in one or more of shape, size, configuration, orientation, radial height, axial length, width, sectional profile, sharpness, or in another manner in order to achieve varying functions such as to accommodate varying loads or stresses or to achieve different types of cuts of stalks. Any of the differing blades may be reversible with a plurality of cutting tips located on differing surfaces which may be identical or different in size, shape, configuration, or sharpness as previously discussed.

Also, the following examples are provided, which are numbered for easier reference.

1. A stalk roll mountable to a header of an agricultural combine for rotation about a rotation axis during processing of plant stalks, the stalk roll including: an annular drum having a plurality of circumferentially spaced flutes extending in an axial direction of the rotation axis of the drum and projecting radially outwardly from the drum, the flutes defining mounting surfaces along lengths of the flutes; a plurality of blades attachable to the drum, multiple of the plurality of blades are attachable to the mounting surface of a common one of the flutes; and mounting hardware configured to removably connect the blades to the mounting surfaces of the flutes.

2. The stalk roll of example 1, wherein each mounting surface is defined at a radially outer surface of the associated flute and includes a backstop blade support upstream from the blades in the direction of rotation of the drum about the rotation axis.

3. The stalk roll of example 2, wherein the backstop blade support extends radially outward farther than a base of the associated flute downstream of the blades in the direction of rotation of the drum about the rotation axis.

4. The stalk roll of claim 1, wherein each mounting surface has at least one flat side configured to make surface contact with the associated blades.

5. The stalk roll of example 4, wherein each mounting surface is a multi-sided pocket configured to make surface contact with multiple sides of the associated blades.

6. The stalk roll of example 5, further including seat inserts mounted intermediate the flutes and the associated blades, the seat inserts having a higher surface finish at a blade-contacting side than at a flute-contacting side.

7. The stalk roll of example 1, wherein the mounting hardware includes a threaded fastener having a head engaging either the associated blades or the associated flute.

8. The stalk roll of example 7, wherein the mounting hardware includes a clamp bar contacting the associated blades and the associated flute that is secured by the threaded fastener.

9. The stalk roll of example 1, wherein the blades attached to the common flute are the same.

10. The stalk roll of example 1, wherein at least one of the blades attached to the common flute is different from the other blades attached to the common flute.

11. The stalk roll of example 10, wherein the at least one of the blades differs in one or more of a radial height, an axial length, a width and a sectional profile from the other blades attached to the common flute.

12. The stalk of example 11, wherein, when mounted to the header, the drum defines a leading end with auger flights configured to direct stalk along the flutes of the drum; and wherein a first of the blades attached to the common flute has a blunt tip defining a round radial tip relative to the other blades attached to the common flute.

13. The stalk roll of example 1, wherein each of the blades defines two cutting tips, one of the cutting tips being in contact with the mounting surfaces when the blades are mounted to the flutes; and wherein the blades are reversibly mounted to the flutes. The terminology used herein is for the purpose of describing particular embodiments only and is not intended to be limiting of the disclosure.

14. A header for an agricultural combine, including: pairs of stalk rolls, each pair of stalk rolls having a first drum spaced apart from a second drum by a channel in which plant stalks are received, each of the first drum and the second drum being rotatable about a rotation axis and having flutes projecting radially outwardly from an annular surface and extending in an axial direction of the rotation axis, the flutes defining mounting surfaces along lengths of the flutes; a plurality of blades attachable to the mounting surfaces of the flutes, multiple of the plurality of blades being attachable to the mounting surface of each flute; and mounting hardware configured to removably connect the blades to the mounting surfaces of the flutes.

15. The header of example 14, wherein at least one of the blades attached to a common one of the flutes is different from the other blades attached to the common flute in one or more of a radial height, an axial length, a width and a sectional profile.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A stalk roll mountable to a header of an agricultural combine for rotation about a rotation axis during processing of plant stalks, the stalk roll comprising:
    an annular drum having a plurality of circumferentially spaced flutes extending in an axial direction of the rotation axis of the drum and projecting radially outwardly from the drum, the flutes defining mounting surfaces along lengths of the flutes;
    a plurality of blades attachable to the drum, multiple of the plurality of blades are attachable to the mounting surface of a common one of the flutes;
    mounting hardware configured to removably connect the plurality of blades to the mounting surfaces of the flutes; and
    seat inserts;
    wherein the mounting surfaces define backstop blade supports upstream from the blades in the direction of rotation of the drum about the rotation axis; and
    wherein the seat inserts are intermediate the backstop blade supports and the associated blades.

2. The stalk roll of claim 1, wherein each mounting surface is defined at a radially outer surface of the associated flute.

3. The stalk roll of claim 1, wherein the backstop blade support extends radially outward farther than a base of the associated flute downstream of the blades in the direction of rotation of the drum about the rotation axis.

4. The stalk roll of claim 1, wherein each mounting surface has at least one flat side configured to make surface contact with the associated seat insert.

5. The stalk roll of claim 4, wherein each mounting surface is a multi-sided pocket configured to make surface contact with multiple sides of the associated seat insert.

6. The stalk roll of claim 5, wherein the seat inserts have a higher surface finish at a blade-contacting side than at a flute-contacting side.

7. The stalk roll of claim 1, wherein the mounting hardware includes a threaded fastener having a head engaging either the associated blade or the associated flute.

8. The stalk roll of claim 7, wherein the mounting hardware includes a clamp bar contacting the associated blade and the associated flute that is secured by the threaded fastener.

9. The stalk roll of claim 1, wherein the blades attached to the common flute are the same.

10. The stalk roll of claim 1, wherein at least one of the blades attached to the common flute is different from the other blades attached to the common flute.

11. The stalk roll of claim 10, wherein the at least one of the blades differs in one or more of a radial height, an axial length, a width and a sectional profile from the other blades attached to the common flute.

12. The stalk of claim 11, wherein, when mounted to the header, the drum defines a leading end with auger flights configured to direct stalk along the flutes of the drum; and
    wherein a first of the blades attached to the common flute has a blunt tip defining a round radial tip relative to the other blades attached to the common flute.

13. The stalk roll of claim 1, wherein each of the blades defines two cutting tips, one of the cutting tips being in contact with the mounting surfaces when the blades are mounted to the flutes; and
    wherein the blades are reversibly mounted to the flutes.

14. A header for an agricultural combine, comprising:
    pairs of stalk rolls, each pair of stalk rolls having a first drum spaced apart from a second drum by a channel in which plant stalks are received, each of the first drum and the second drum being rotatable about a rotation axis and having flutes projecting radially outwardly from an annular surface and extending in an axial direction of the rotation axis, the flutes defining mounting surfaces along lengths of the flutes;
    a plurality of blades attachable to the mounting surfaces of the flutes, multiple of the plurality of blades being attachable to the mounting surface of each flute;
    mounting hardware configured to removably connect the blades to the mounting surfaces of the flutes; and
    seat inserts;
    wherein the mounting surfaces define backstop blade supports upstream from the blades in the direction of rotation of the drum about the rotation axis; and
    wherein the seat inserts are intermediate the backstop blade supports and the associated blades.

15. The header of claim 14, wherein each mounting surface is defined at a radially outer surface of the associated flute;
    wherein each backstop blade support extends radially outward farther than a base of the associated flute downstream of the blades in the direction of rotation of the drum about the rotation axis.

16. The header of claim 14, wherein each mounting surface is a multi-sided pocket configured to make surface contact with multiple sides of the associated seat insert.

17. The header of claim 16, wherein the seat inserts having a higher surface finish at a blade-contacting side than at a flute-contacting side.

18. The header of claim 14, wherein the blades attached to a common one of the flutes are the same.

19. The header of claim 14, wherein at least one of the blades attached to a common one of the flutes is different from the other blades attached to the common flute in one or more of a radial height, an axial length, a width and a sectional profile.

20. The header of claim 19, wherein the first drum and the second drum define leading ends with auger flights configured to direct stalk along the flutes of the drums; and wherein a first one of the blades attached to the common flute has a blunt tip defining a round radial tip relative to the other blades attached to the common flute.

* * * * *

UNITED STATES PATENT AND TRADEMARK OFFICE
CERTIFICATE OF CORRECTION

PATENT NO. : 10,820,512 B2  
APPLICATION NO. : 16/108987  
DATED : November 3, 2020  
INVENTOR(S) : Steve A. Coon It is certified that error appears in the above-identified patent and that said Letters Patent is hereby corrected as shown below:

In the Claims

In Column 14, Claim 12, Line 20, delete "stalk" and insert -- stalk roll --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*